No. 820,001. PATENTED MAY 8, 1906.
T. KENDRICK.
SPRING HAND TRUCK.
APPLICATION FILED APR. 25, 1905.

Witnesses:
C. Mackintosh Hill
George A. Ellis

Inventor: Thomas Kendrick.
By Henrie & Hayward Attorney.

UNITED STATES PATENT OFFICE.

THOMAS KENDRICK, OF CAVERSHAM, NEW ZEALAND.

SPRING HAND-TRUCK.

No. 820,001.  Specification of Letters Patent.  Patented May 8, 1906.

Application filed April 25, 1905. Serial No. 257,383.

*To all whom it may concern:*

Be it known that I, THOMAS KENDRICK, a subject of His Majesty the King of Great Britain and Ireland, residing at Parkside, Caversham, in the Provincial District of Otago, in the Colony of New Zealand, have invented certain new and useful Improvements in Spring Hand-Trucks, of which the following is a specification.

This invention relates to hand-trucks usually used for removing filled sacks and general merchandise.

The invention provides improvements in the construction of said trucks principally consisting in the introduction of a third wheel and of springs between the wheels and the truck.

Figure 1:
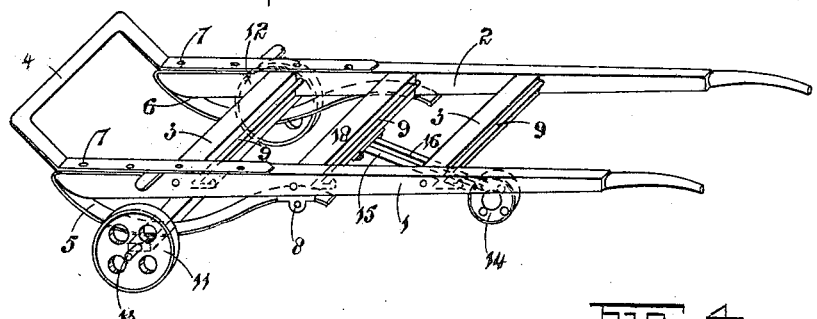
Figure 2:
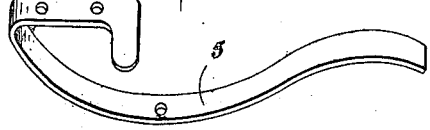
Figure 4:
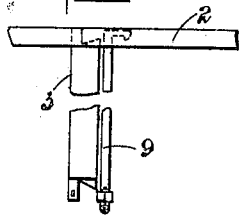
Figure 3:
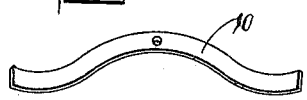
Figure 5:
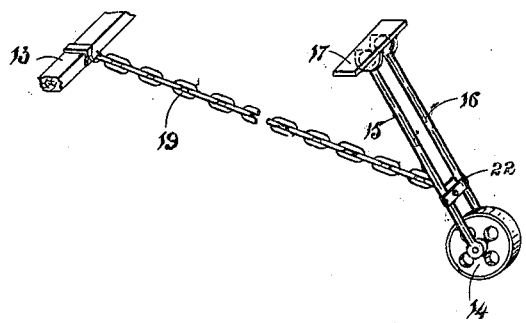
Figure 6:
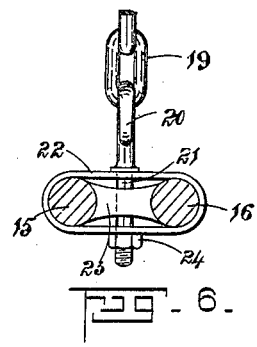

In the drawings, Figure 1 is a side perspective elevation of a truck constructed according to my invention. Fig. 2 is a similar view of a side spring; Fig. 3, a similar view of a cross-spring, and Fig. 4 is a side elevation of a strap-bolt. Fig. 5 is a perspective elevation of a third wheel and its connections, and Fig. 6 is a plan of a hook and its fastenings.

The truck is constructed of the side pieces 1 and 2, connected by the cross-bars 3. The prizing-iron 4 is made in the ordinary way. Side springs 5 and 6 are each secured to the respective side pieces 1 and 2 by bolts 7, which pass through the spring, the prizing-iron, and side piece. The inner end of the spring passes through a bracket 8, which is fixed beneath the side piece, whereby freedom of play of the spring under a load is permitted. The strap-bolts 9 extend across the truck and tie the side pieces together, the cross-bars being tenoned into the side pieces.

For larger-size trucks designed to carry heavy loads I employ the transverse spring 10. (Shown in Fig. 3.) This is bolted beneath the cross-bar above the axle, with its ends resting upon the respective side springs. The wheels 11 and 12 of the truck are revolubly carried upon an axle 13, which is bolted to the side springs. The third wheel 14 is revolubly mounted between rods 15 and 16, which are pivoted to the bracket 17, fixed to the cross-bar 18. The inclination of the rods 15 and 16 is adjusted to vary the inclination of the truck by means of a chain 19, which is attached at one end to the axle of the truck 13 and at its other end to the rods 15 and 16 by means of a hook 20, having a shank 21, passing through a flexible band 22, surrounding the said rods, and through a distance-piece 23 between the rods. The shank of the stud is screw-threaded and has a nut 24, the screwing up of which draws the sides of the band 22 together and tightens the rods upon the distance-piece 23, thereby securely binding these parts together.

What I claim, and desire to secure by Letters Patent of the United States, is—

1. For the purpose indicated, a truck having side pieces, springs between the side pieces and the axle of the truck, each of said springs being secured to one of the side pieces at one end and having its other end received by a bracket bolted to the side piece, a wheel mounted upon arms, a bracket upon the truck to which the arms are pivoted, a chain attached at one end to the axle of the truck, a hook to which the other end of the chain is attached, a screw-threaded shank to the hook, a nut upon the shank, a flexible band surrounding the said arms, a distance-piece between the arms, the shank of the hook passing through the band and distance-piece, substantially as set forth.

2. In a truck, a hook having a screw-threaded shank and a nut, a flexible band surrounding rods to which the hook is attached, and a distance-piece between the rods, substantially as set forth.

In testimony whereof I have signed my name to this specification in the presence of two witnesses.

THOMAS KENDRICK.

Witnesses:
 H. W. LACKISACK,
 S. P. MIRAM.